E. L. MILLS & J. W. WHITFORD.
LATHE ATTACHMENT FOR TURNING TAPER SURFACES.
APPLICATION FILED JUNE 7, 1911.
1,031,726.
Patented July 9, 1912.
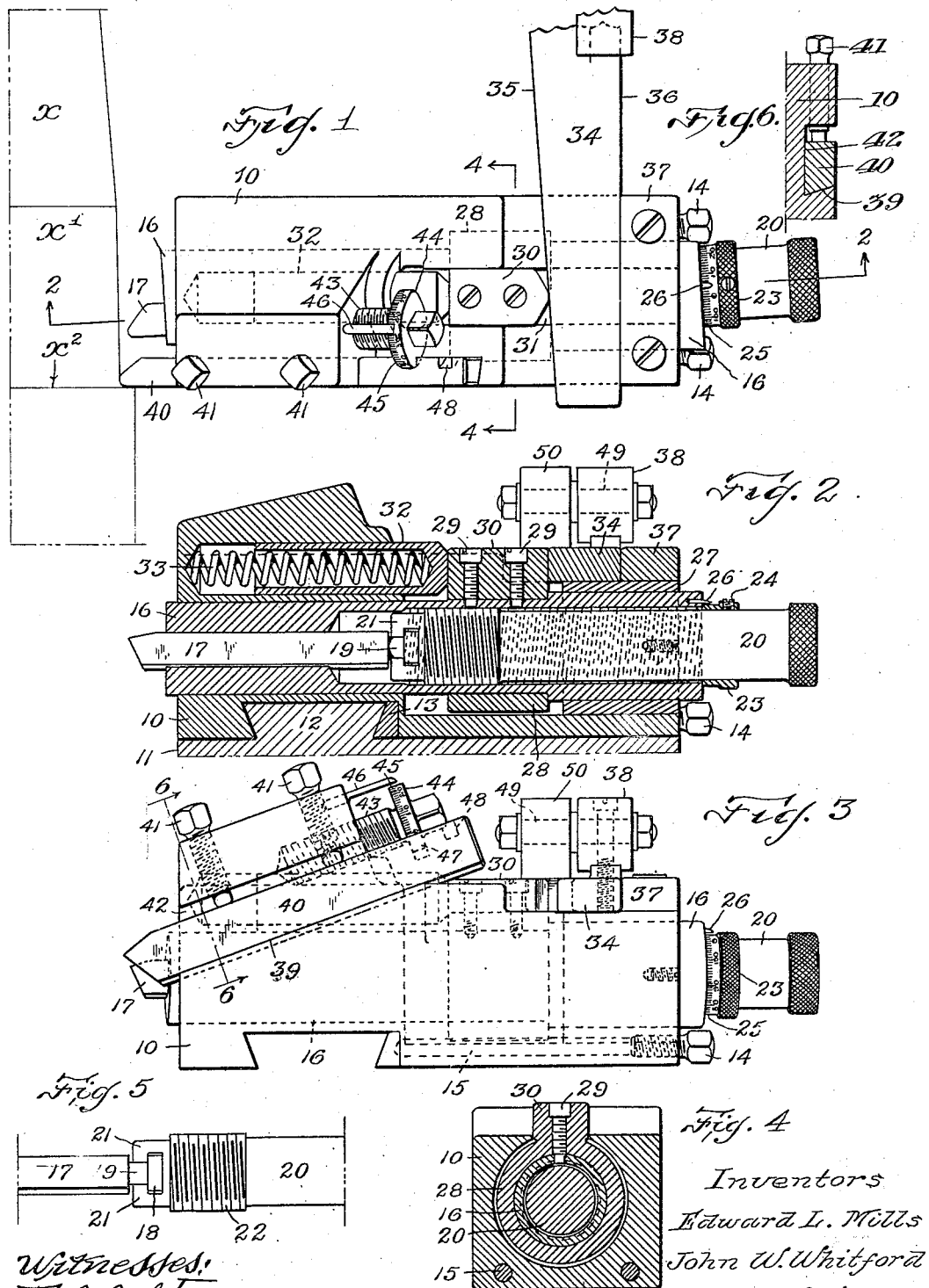

UNITED STATES PATENT OFFICE.

EDWARD LEWIS MILLS, OF FITCHBURG, MASSACHUSETTS, AND JOHN WALTER WHITFORD, OF JERSEY CITY, NEW JERSEY, ASSIGNORS TO FITCHBURG MACHINE WORKS, OF FITCHBURG, MASSACHUSETTS, A CORPORATION OF MASSACHUSETTS.

LATHE ATTACHMENT FOR TURNING TAPER SURFACES.

1,031,726.  Specification of Letters Patent.  Patented July 9, 1912.

Application filed June 7, 1911. Serial No. 631,814.

*To all whom it may concern:*

Be it known that we, EDWARD LEWIS MILLS and JOHN WALTER WHITFORD, respectively of Fitchburg, in the county of Worcester and State of Massachusetts, and of Jersey City, in the county of Hudson and State of New Jersey, have invented certain new and useful Improvements in Lathe Attachments for Turning Taper Surfaces, of which the following is a specification.

The object of the present invention is to provide means adapted to be attached to a lathe for turning taper surfaces.

The attachment comprises a tool block intended to be fixed to a feed carriage, a tool mounted in the block so as to be movable transversely of the axis of the work, and a templet adapted to be anchored to a suitable fixture of the lathe for controlling the transverse movement of the tool. In this embodiment of the invention the templet is formed and arranged to hold the tool against the work, and spring tension mechanism is provided for retracting the tool so as to keep it in coöperative relation with the templet.

The invention also consists in the combination with the movable tool of a fixed tool whereby the two tools carried by the same tool block may act independently to produce a tapering portion and a cylindric portion, or a tapering portion and a transverse shoulder. One of the features pertaining to the combination of these two tools is the arrangement of the movable tool whereby its cutting portion is brought close to the cutting portion of the fixed tool.

Of the accompanying drawings which illustrate one form in which the invention may be embodied: Figure 1 represents a top plan view of the tool block and templet. Fig. 2 represents a longitudinal vertical section thereof in a plane indicated in Fig. 1 by line 2—2. Fig. 3 represents a side elevation of the tool block. Fig. 4 represents a vertical section in a plane indicated in Fig. 1 by line 4—4. Fig. 5 represents an elevation of the inner end of the taper-turning tool, and its adjusting device. Fig. 6 represents a cross section in the plane indicated in Fig. 3 by line 6—6.

The same reference characters indicate the same parts, wherever they occur.

The tool block, indicated at 10, is formed with a dovetail groove in its lower surface whereby it is adapted to be mounted upon a feed carriage 11 having a rib 12 formed to fit in the groove of the tool block. A gib 13 interposed between the rib 12 and a portion of the tool block is adapted to be forced against the rib to fix the position of the tool block with relation to the carriage. For this purpose the tool block is provided with setscrews 14 and thrust rods 15 for transmitting the pressure of the setscrews to the gib.

The tool block is formed with a socket open at both ends for the reception of a plunger or tool holder 16. A tool 17 for turning taper surfaces is mounted in the plunger, the plunger being formed with a suitable socket of the same cross section as the tool. The plunger is adapted to slide longitudinally in the tool block for the purpose of obtaining the tapering effect, and the tool is adapted to slide longitudinally in its bearing in the plunger for the purpose of initial adjustment.

The inner end of the tool is formed so as to provide a cylindric head 18 and a cylindric neck 19. An adjusting member 20 is provided with fingers 21 adapted to embrace the head 18 in the manner shown by Fig. 5. The member 20 is provided with a screw-threaded portion 22 which engages an internal thread in the plunger 16. The connection between the member 20 and the tool is such as to permit rotation of the former, whereby a screw adjustment may be imparted to the tool. Aside from the adjusting movement thus provided, the tool is rigid with relation to the plunger. A collar 23 loosely surrounding the outer end of the member 20 is provided with a setscrew 24 by which it may be secured to the member 20 at any desired position. The collar is provided with index marks 25 which are adapted to be read in conjunction with an index member 26 projecting from the plunger. This adjusting means and index do not form any part of the present invention and are not herein claimed. A bushing 27 surrounding the plunger at the end nearer the index device is affixed in the tool block to provide a suitable bearing in which the plunger may slide. A collar 28 having a boss 30 (see Fig. 4) is affixed to the plunger by screws 29, and its function is to transmit movement to the plunger for moving the tool toward and from the work. The boss 30 is fitted to slide in a slot 31 in the upper side of the tool block. One face of the boss 30 is engaged by spring tension means for retracting the tool from the work while the opposite face of the boss is adapted to coact with a templet for holding the tool against the work. The spring tension means, as shown by Fig. 2, comprises a sliding barrel 32 and spring 33 contained in a socket in the tool block. The templet, indicated at 34, is formed with a working face 35 for engaging the boss 30, and with a face 36 for engaging an abutment 37 affixed to the tool block. The templet is affixed to a stationary holder 38 in such position that the face 36 is parallel to the path of feeding movement of the carriage 11.

The working surface 35 may be of any desired formation, depending upon the character of the work to be produced. As shown by Fig. 1, the surface 35 is straight and is inclined with relation to the surface 36, and it is adapted to produce a uniform tapering surface on the work. The tool block, according to the arrangement shown by Fig. 1, is intended to be fed from the top toward the bottom of the drawing. The tool 17 would therefore begin cutting the smaller end of the tapering portion and would be retracted by the spring 33 as the carriage is fed, the retractory movement of the tool being controlled by the templet 34. Under some conditions it might be desirable to feed the carriage in the opposite direction, in which case the tool would begin at the larger end of the taper and would be moved toward the axis of the work by the templet.

The tool block is provided with a recess open at one side for the reception of a tool 40. The faces 39 and 42 of the tool block are at an acute angle and the tool is formed with faces at a similar angle which are held against those of the tool block by set screws 41. A micrometer adjusting screw 43 is threaded in the tool block for adjusting the tool 40. The screw 43 is formed with a collar 44 on the periphery of which are a series of index marks 45 which are to be read in conjunction with an index member 46 projecting from the tool block. The inner side of the tool is provided with a notch 47 into which the collar 44 extends, the collar having a working fit with the confronting faces which define the notch. When the adjusting screw is turned, its longitudinal movement is transmitted to the tool through the medium of the collar. The tool illustrated is provided with a second notch, indicated at 48, into which the collar 44 may be inserted instead of into the notch 47. The notch 48 would be used if it were desirable to place the tool 40 nearer the axis of the work or if the cutting end of the tool were so worn away as to require advancement of the tool.

The axis of the socket in which the plunger 16 slides is at right angles to the axis of the work. It will be observed by referring to Fig. 1 that the axis of the tool 17 and the adjusting member 20 is inclined with relation to the axis of the plunger in such manner as to place the point of the tool 17 in close relation to the tool 40. This arrangement of the tools is desirable because it enables them to work within relatively close limits.

In producing a piece of work of the character represented in Fig. 1, the tool 17 produces the tapering portion $x$ and the tool 40 produces the cylindric portion $x'$ and shoulder $x^2$. It is oftentimes desirable to retract the tool 17 to inoperative position and to use the tool 40 alone. For this reason the templet holder 38 is mounted upon a pivot stud 49 supported by a fixture 50. This manner of mounting the templet makes it possible to lift the templet away from the tool block, whereupon the tool will be further retracted by the spring 33. When the tool is thus retracted, the templet may be permitted to rest upon the top of the boss 30 or may be otherwise supported.

We claim:

1. In a metal-working machine, the combination with a feed carriage, a tool block affixed thereto, and a tool affixed on the block for forming a cylindric surface, of a tool mounted on said block to slide close to said fixed tool, and a templet adapted to cause movement of said sliding tool with relation to the fixed tool block when the feed carriage is moved, whereby a non-cylindric surface may be formed to join a cylindric surface produced by said fixed tool.

2. In a metal-working machine, a feed carriage, a tool block thereon, a tool holder fitted to slide in a bearing in said block, a templet, said tool holder having a shoulder adapted to coact with said templet, said templet being mounted to swing about a pivot to and from operative position, and spring tension means acting on said tool holder to keep said shoulder against the templet.

3. In a metal-working machine, a tool block, a tool holder fitted to slide in a bearing therein, a tool mounted on said block independently of said holder, and a tool mounted in said holder at an angle to the line of sliding movement of the holder, whereby the cutting ends of the tools may be arranged close to each other.

4. In a metal-working machine, a tool block, a tool holder fitted to slide therein and having a recess, a tool fitted to slide in said recess, and means for securing the tool in the holder, the line of said recess being at an angle to the line of movement of the holder with relation to the tool block.

5. In a metal-working machine, a tool block, a tool adjustably mounted therein, said tool having a notch whereby the tool is provided with transverse confronting faces, and a screw in threaded engagement with said tool block and having a collar adapted to fit between said confronting faces of the tool whereby the tool may be adjusted.

6. In a metal-working machine, a tool block, a tool adjustably mounted therein, said tool having a notch whereby the tool is provided with transverse confronting faces, a screw in threaded engagement with the tool block and having a collar adapted to fit between said confronting faces of the tool, a series of index marks on said collar, and an index on said tool block adapted to coöperate with said series of index marks.

7. In a metal-working machine, a tool block having a tool recess open at one side for lateral insertion and removal of a tool, a tool having longitudinal faces at an acute angle to each other in cross section, said tool block having faces at a similar angle for supporting the tool, and a setscrew threaded in said tool block and adapted to force the tool against both of said faces of the tool block.

In testimony whereof we have affixed our signatures, in presence of two witnesses.

EDWARD LEWIS MILLS.
JOHN WALTER WHITFORD.

Witnesses to the signature of Edward Lewis Mills:
   LOWELL H. STEARNS,
   RUSSELL F. ALDRICH.

Witnesses to the signature of John Walter Whitford:
   LEON ERVIN,
   WILLIAM RANKIN.

---

Copies of this patent may be obtained for five cents each, by addressing the "Commissioner of Patents, Washington, D. C."